July 11, 1961  J. B. DE REMER  2,991,839
AUTOMATIC VEHICLE DECELERATING APPARATUS
Filed April 15, 1958  2 Sheets-Sheet 1

INVENTOR
John B. DeRemer

BY  Frease & Bishop
ATTORNEYS

July 11, 1961 J. B. DE REMER 2,991,839
AUTOMATIC VEHICLE DECELERATING APPARATUS
Filed April 15, 1958 2 Sheets-Sheet 2

INVENTOR
John B. DeRemer

BY Frease & Bishop
ATTORNEYS

United States Patent Office 2,991,839
Patented July 11, 1961

2,991,839
AUTOMATIC VEHICLE DECELERATING APPARATUS
John B. De Remer, 7116 Massillon-Akron Road, NW., North Canton, Ohio, assignor of small interests to various assignees
Filed Apr. 15, 1958, Ser. No. 728,715
3 Claims. (Cl. 180—82)

This invention relates to an automatic safety mechanism for automotive vehicles which becomes operative upon conscious or unconscious release of the steering wheel by the operator of the vehicle and is a continuation in part of my application Serial No. 653,916, filed April 19, 1957, now abandoned.

Automatic control devices for automotive vehicles in the past have included not only brake devices but also means for decelerating a vehicle, which mechanisms have been dependent upon the normal grasping of a steering wheel by the operator. Such prior devices, however, have usually been of complicated construction and expensive in installation, for which reason their general acceptance and use in the average automobile have been substantially limited.

The device of the present invention is an improvement over such prior devices in several respects. It is secured to the undersurface of a steering wheel that when normally grasped by the operator permits the automobile to be operated under ordinary operating conditions. A control bar on the underside of the steering wheel is not contacted by the driver's body inadvertently such as in the event of his slumping forward over the wheel when unconscious. When the steering wheel is released by the operator, however, an automatic safety mechanism is set into operation whereby the vehicle is decelerated and brought to a halt.

The device of the present invention also incorporates a means for automatically rendering the automobile accelerator inoperative when the operator releases the steering wheel and thereby sets the device into operation. Moreover, the device includes a delayed action means or turning lockout which operates to prevent the ordinary functioning of the device when an automobile is being parked. Thus the operator is not impeded from parking a vehicle when he must frequently grasp and release a steering wheel and turn the same from one extreme position to the other during a normal parking maneuver. The mechanism also comprises an audible device for warning an operator in the event he is falling asleep and unconsciously releasing the steering wheel, as well as front and rear lights for warning operators of other vehicles.

Accordingly, it is a general object of the present invention to provide a safety control device for an automobile which is directly responsive to the operator's grasping of the steering wheel.

It is another object of this invention to provide means for actuating certain signal means both to the driver of the vehicle involved and those of other vehicles.

Finally, it is an object of this invention to provide an improved safety control device for automotive vehicles which incorporates the foregoing desiderata in an inexpensive manner and with simplified maintenance and operation.

These and other objects and advantages apparent to those skilled in the art from the following description and claims may be obtained, the stated results achieved, and the described difficulties overcome by the discoveries, principles, apparatus, parts, elements and combinations and subcombinations which comprise the present invention, the nature of which is set forth in the following general statement, a preferred embodiment of which— illustrative of the best mode in which applicant has contemplated applying the principles—is set forth in the following description and shown in the drawings, and which is particularly and distinctly pointed out and set forth in the appended claims forming part hereof.

The nature of the improved safety control device of the present invention may be stated in general terms as including a gripping bar on the undersurface of the steering wheel which when grasped by the operator applies a pneumatic or hydraulic force which sustains a closed electrical circuit, a first solenoid-operated braking device operatively connected to the braking mechanism of the vehicle and to the carburetor of a vehicle, lights mounted at the front and rear of the vehicle, an audible signal device within the vehicle, an electrical circuit extending from the pneumatic means in the steering wheel to the solenoid, the lights and the audible signal device, and the vehicle also having a transmission which when engaged in the forward drive position sustains the electrical circuit in the closed position.

By way of example, a preferred embodiment of the apparatus of the present invention is illustrated diagrammatically in the accompanying drawings forming part hereof wherein.

Similar numerals refer to similar parts throughout the various views of the drawings.

Figure 1:
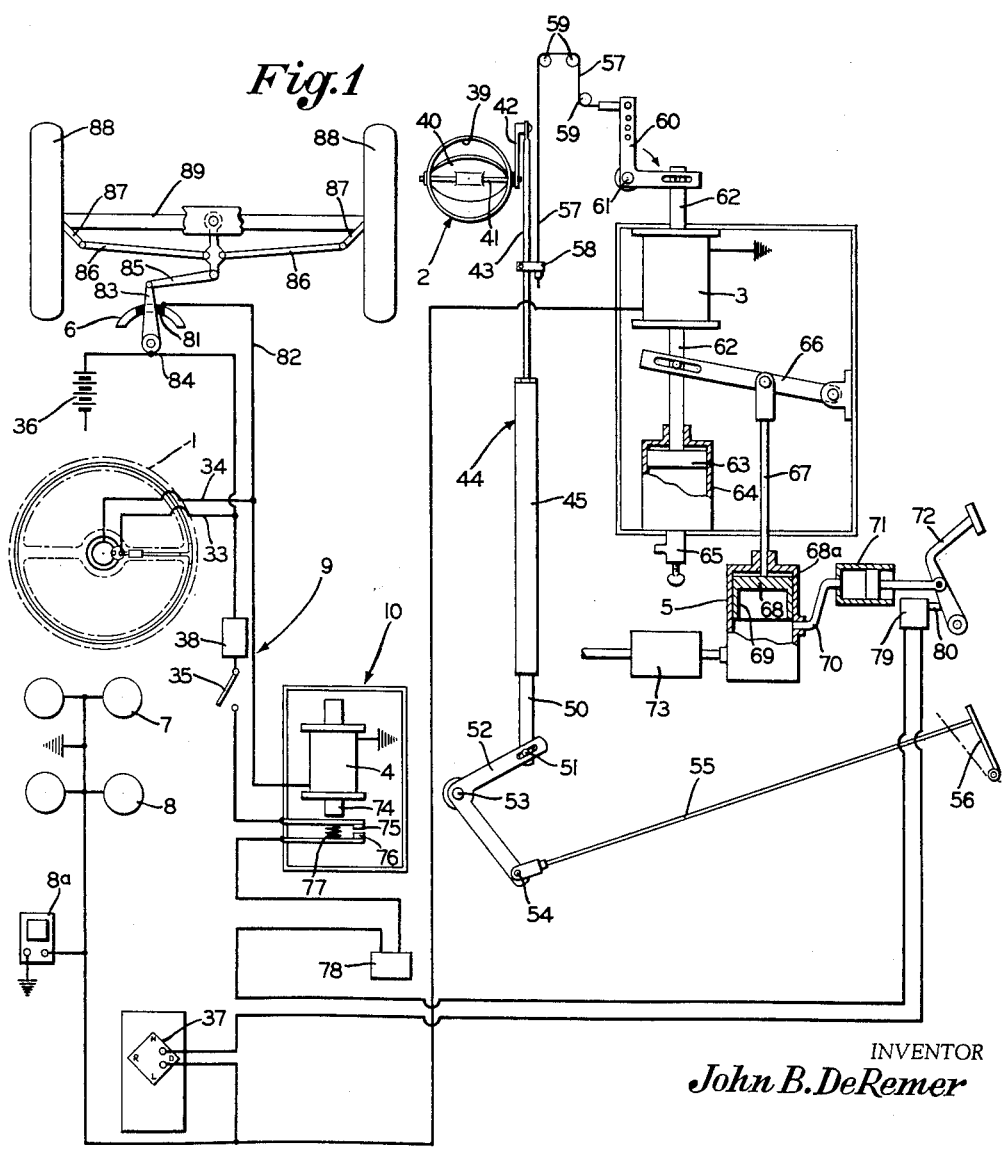
FIGURE 1 is a diagrammatic view of the device of the present invention including its electric circuit.

As shown in FIG. 1, the control mechanism of the present invention includes a steering wheel 1, valve means 2 for a carburetor of a vehicle, a first solenoid 3, a second solenoid 4, brake actuating means 5, and a turn-park lockout or arcuate member 6. In addition, the device includes two pairs of lights 7 and 8, an electrical circuit generally indicated at 9, and a relay switch generally indicated at 10.

Figure 3:
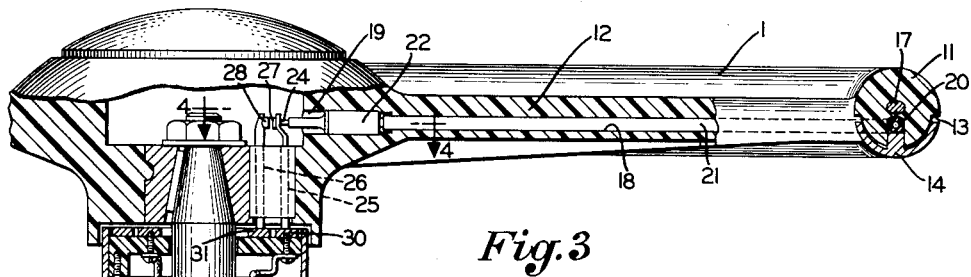
FIG. 3 is a fragmentary vertical sectional view through a steering wheel and a portion of a steering column.
Figure 4:
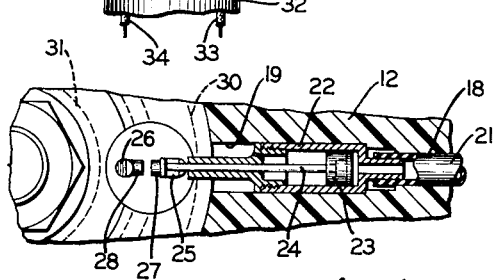
FIG. 4 is a fragmentary horizontal sectional view through a steering wheel and a portion of the steering column, taken on the line 4—4 of FIG. 3.
Figure 5:
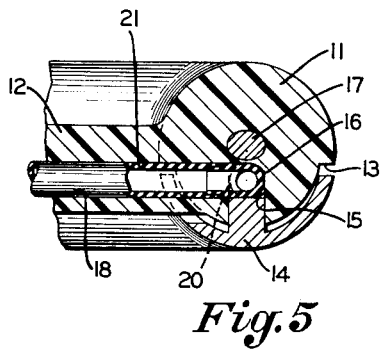
FIG. 5 is an enlarged fragmentary view of the peripheral portion of the steering wheel as shown in FIG. 3.

As shown in FIG. 3, the steering wheel 1 includes an outer peripheral portion 11 and a spoke portion 12 extending between the peripheral portion and the central portion in the usual manner. The undersurface of the peripheral portion 11 has an arcuate recess 13 in which is disposed an annular member or bar 14, the transverse cross section of which is substantially similar to that of the recess 13. The peripheral portion 11 has a substantially radially extending opening 15 (FIG. 5) extending inwardly from the arcuate recess 13 to an enclosed passage 16 that extends continuously around the peripheral portion and below an annular metal reinforcing ring 17 in said portion. A passage 18 extends from and communicates with the annular passage 16 through the spoke portion 12 to an enlarged passage 19 (FIG. 4) at the inner end of the spoke portion 12.

As shown in the drawings, a continuous tube 20 composed of resilient material is disposed in the annular passage 16 and a tube 21 is mounted in the passage 18. The tube 21 communicates with the interior of the tube 20 and extends to the enlarged passage 19 where it communicates with a hydraulic cylinder 22 which is mounted in the enlarged passage. The cylinder 22 has a piston 23 (FIG. 4) including a plunger 24, the outer end of which engages the upper end of a spring-biased brush 25. Operation of the piston 23 engages two normally spaced contacts 27 and 28 on brushes 25 and 26, respectively. The tubes 20 and 21 are filled with a hydraulic fluid for actuating the piston and holding the contact 27 against the contact 28 when the tube 20 is compressed by the operator normally holding the steering wheel and squeezing the annular bar 14 into the recess 13. Accordingly, when the steering wheel 1 is grasped, the usual force applied for holding the wheel is sufficient to squeeze the tube 20 for applying hydraulic force against the piston 23 and move the contacts together into engagement.

As shown in FIG. 3, the contact 27 is mounted at the upper end of the brush 25 and the contact 28 is mounted at the top of a stationary brush 26. The lower ends of the brushes 25 and 26 are separately connected to circular members 30 and 31, respectively, which members are concentrically disposed at the upper end of a steering column 32. The circular members 30 and 31 are connected to a wire 33 and 34, respectively, which wires are part of the electric circuit 9.

The circuit 9 also includes an ignition switch 35 for connection of the circuit with a battery 36. Where a vehicle includes an automatic transmission having a control device 37 with various speeds indicated such as high or drive position ("D"), the circuit may be connected through the transmission so that the device is operative only when the vehicle functions in high or drive position ("D") on the open road.

Usually the transmission control device 37 is placed in neutral position "N" for starting the engine, in which position the control device 37 is inoperative. As shown in FIG. 1, the ignition switch 35 is associated with ignition means 38 for starting a motor of the vehicle.

The valve means 2 on the carburetor is of conventional construction and includes an opening 39 through which air enters a carburetor (not shown). The opening 39 is provided with a closure or valve member 40 rotatable about a pin 41 extending across the opening. The outer end of the pin 41 is connected to a lever 42 which rotates the pin.

Figure 2:
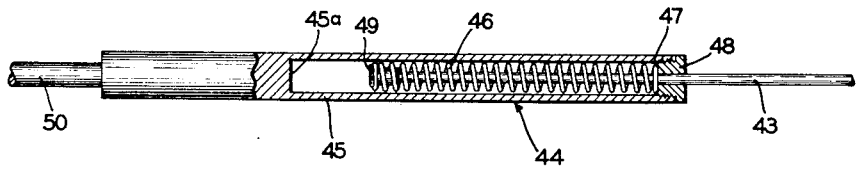
FIG. 2 is a sectional view of a compensating link.

The end of the lever 42 remote from the pin 41 is pivotally attached to one end of a shaft 43 which is movable longitudinally. The shaft 43 is a part of a compensating link 44 which also includes a tubular-like member 45 in which a portion of the shaft 43 is spring-mounted as shown in FIG. 2 on a helical spring 46. One end of the spring 46 is secured such as by a weld 47 to an end closure 48 of the member 45. The other end of the spring is secured such as by a weld 49 to the inner end of the shaft 43.

At the end of the member 45 opposite the closure 48, an extension link 50 is provided for pivotal connection at 51 to a bell crank 52 which is pivotally mounted at 53. The other end of the bell crank 52 is pivotally connected at 54 to an elongated shaft 55, the opposite end of which is secured to an accelerator pedal 56 in a conventional manner.

As shown in FIG. 1, a cable 57 is connected at one end to the shaft 43 by a bracket 58. The cable 57 is disposed over a number of pulleys 59 and is secured at the other end to a bell crank 60 pivotally mounted at 61. A plunger 62 of the solenoid 3 is attached to the other end of the bell crank 60.

The solenoid 3 when energized pulls the plunger 62 downwardly, thereby rotating the bell crank 60 in a clockwise direction. Such movement of the bell crank 60 pulls the shaft 43 of the compensating link 44 upwardly through the cable 57 in order to close the opening 39 by the valve 40. When the shaft 43 is pulled upwardly by the cable 57, the shaft operates against the force of the spring 46 within the member 45 in order to close the accelerator opening 39, notwithstanding an attempt on the part of the operator to keep it open by manipulation of the accelerator pedal 56. In other words, when the solenoid 3 is actuated, it renders the accelerator pedal 56 ineffective due to the particular construction of the compensating link 44. On the other hand, when the solenoid 3 is inoperative, depression of the accelerator pedal is transferred through the shaft 55, the bell crank 52, and the tubular-like member 45 to the shaft 43 either through the spring 46 or by contact of the end of the shaft by an inner surface 45a of the member 45.

The solenoid 3 also operates the brake actuator 5. As shown in FIG. 1, the lower end of the solenoid plunger 62 is provided with a piston 63 within an air cylinder 64. The lower end of the cylinder is provided with an adjustable valve or needle valve 65 by which the amount of air passing into and out of the cylinder 64 may be adjusted. Thus the assembly of the piston 63, the cylinder 64, and the valve 65 serves as a shock absorber or dampener for the quick acting solenoid 3 and thereby prevents unduly sudden application of the brakes.

The plunger 62 is also connected to a lever 66. A piston rod 67 is connected at its upper end to the lever 66 and is provided at its lower end with a piston 68 enclosed within a cylinder 68a. The piston 68 has a flange 69 extending substantially below the body of the piston so that the flange 69 closes off a connection passage 70 extending to a brake cylinder 71 operated directly by a brake pedal 72. Thus, when the solenoid 3 is actuated, the piston 68 is driven downwardly in the cylinder 68a, whereby the flange 69 renders the brake pedal 72 ineffective by closing the passage 70. Thereafter, further depression of the piston 68 operates a power brake control cylinder 73 which is normally actuated by hydraulic fluid in the several cylinders 71, 68a, and 73, as well as their interconnecting members such as the passage 70.

In order to adjust the abruptness of the application of the brakes, the valve 65 may be adjusted to the desired setting so that air in the cylinder 64 is driven out through the needle valve 65 at a desired rate.

As shown in FIG. 1, the relay switch 10 includes the solenoid 4 having a plunger 74 which drops down when the solenoid is de-energized. Such movement of the plunger 74 closes the circuit through a switch including a pair of contacts 75 and 76 which are held normally open by a spring 77.

The electric circuit 9 is also provided with a switch 78 which is mechanically operated by a hand brake so that when the brake is released for operating a vehicle, the switch 78 closes the circuit. When the hand brake is applied, it opens the switch 78.

Similarly, a switch 79 having a plunger 80 is provided for operation with the foot brake pedal 72. When the foot brake is applied against the plunger 80, the switch 79 is actuated to open the electric circuit 9 to render the control mechanism inoperative and to permit normal operation of the braking mechanism.

The turn-park lockout 6 is an arcuate member having an intermediate portion 81 which is an electrical conductor and having opposite end portions which are dielectrics. The intermediate portion 81 is connected to the electrical circuit by a wire 82. The turn-park lockout member 6 functions with a pitman arm 83 at the lower end of the steering column 32 and the arm is connected to the electric circuit 9 by a wire 84. The pitman arm 83 is a portion of a driving mechanism which also includes a drag link 85, tie rods 86, and knuckle arms 87, and operates to turn wheels 88 mounted on an axle 89.

During straight travel of the vehicle, the pitman arm 83 is in contact with the intermediate portion 81 of the member 6, thereby closing the circuit through the wiring diagram 9. However, when extreme turns are actuated such as during parking of a vehicle, it is desirable that the entire control mechanism be inoperative during repeated grasping and releasing of the steering wheel for extreme turns. Therefore, when the pitman arm 83 is disposed over the opposite end portions of the member 6 as when the wheels 88 are being turned, the entire control mechanism is inoperative.

During normal operation of a vehicle, when the steering wheel 1 is grasped by an operator, the circuit 9 is closed because the annular bar 14 is pressed against the annular tube 20, causing hydraulic fluid in the tubes 20 and 21 to actuate the piston 23 in the cylinder 22. The contacts 27 and 28 are thereby engaged and a circuit through the wires 33 and 34 is closed. Hence the relay 4 is energized to hold the plunger 74 up and thereby preventing the circuit from being closed through the spaced-apart contacts 75 and 76.

In addition, the circuit is closed by the ignition switch 35 by the use of an ignition key in the usual manner. Moreover, the hand brake switch 78 is closed upon release of a hand brake.

When a vehicle having an automatic transmission is started, the transmission is normally in the neutral or "N" position so that the circuit remains open and the control mechanism is ineffective until the transmission control 37 is shifted to the drive or "D" position, which is the only position that is connected to the control mechanism. The operator may manipulate the transmission from the starting neutral position to any other position, such as reverse or "R," or low or "L," and thereby avoid operation of the control mechanism.

Accordingly, when a vehicle provided with the control mechanism is proceeding in the normal drive ("D") position, the switches 35, 78, and 79, and the steering wheel switch are normally closed. But the electric circuit 9 is open because the plunger 74 of the energized solenoid 4 retains the contacts 75 and 76 open. Upon release of the steering wheel 1, the circuit 9 is closed by the de-energized solenoid 4, thereby operating the control device, including the lights 7 and 8, an audible driver-signal or buzzer 8a, and the solenoid 3 for the brake and carburetor. In this manner the brake is applied to the vehicle and the vehicle motor is decelerated by the closing of the opening 39.

In the foregoing description certain terms have been used for brevity, clearness and understanding, but no unnecessary limitations are to be implied therefrom as such words are used for descriptive purposes herein and are intended to be broadly construed.

Moreover, the embodiment of the improved construction illustrated and described herein is by way of example and the scope of the present invention is not limited to the exact details of construction shown.

Having now described the features, constructions and principles of the invention, the characteristics of the new automatic vehicle brake control construction, and the advantageous, new and useful results provided; the new and useful discoveries, principles, parts, elements, combinations, subcombinations, structures and arrangements, and mechanical equivalents obvious to those skilled in the art are set forth in the appended claims.

I claim:

1. In an automotive vehicle of the type having a steering wheel mounted on a steering column, hydraulic brakes, a fuel line valve, an accelerator pedal connected to the valve, a normally open electric switch in the steering wheel, solenoid means for operating the hydraulic brakes, an electrical circuit connecting the electric switch in the steering wheel with the solenoid, and a pressure responsive hydraulic flexible tube in the steering wheel for closing the switch upon manual gripping of the steering wheel by an operator of the vehicle; the combination of an automatic decelerating apparatus including compensating link means operatively connected between the fuel line valve and the accelerator pedal for opening and closing the valve upon manipulation of the accelerator pedal, the link having two members with closely spaced end portions movable with respect to each other and having two remote end portions, a helical spring yieldingly holding the spaced end portions apart, a lever upon the fuel line valve pivotally connected to the remote end of one member, a bell crank pivotally connected to the remote end of the other member, a rod connecting said bell crank to the accelerator pedal, a cable connected to said one member, pulley means over which the cable is located, and a bell crank operatively connecting said cable to the solenoid means for closing the valve simultaneously with operation of the brakes.

2. In an automatic vehicle of the type having a steering wheel mounted on a steering column, hydraulic brakes, a fuel line valve, an accelerator pedal connected to the valve, a normally open electric switch in the steering wheel, solenoid means for operating the brakes, an electrical circuit connecting the electric switch in the steering wheel with the solenoid, and a pressure responsive hydraulic flexible tube in the steering wheel for closing the switch upon manual gripping of the steering wheel by an operator of the vehicle; the combination of automatic decelerating apparatus including compensating link means operatively connected between the fuel line valve and the accelerator pedal for opening and closing the valve upon manipulation of the accelerator pedal, the link having two members with closely spaced end portions movable with respect to each other and having two remote end portions, a helical spring yieldingly holding the spaced end portions apart, the remote end of one member being operatively attached to the fuel line valve and the remote end of the other member being operatively connected to the accelerator pedal, said one member also being connected with the solenoid means for closing the valve simultaneously with operation of the brakes, a pitman arm at the lower end of the steering column, a turn-park lockout member engaging the pitman arm and coextensive with the movement thereof, the turn-park lockout member having an intermediate electrical conductive portion and having opposite non-conductor end portions, the pitman arm and the intermediate conductive portion being operatively connected to the electric circuit, whereby the automatic decelerating apparatus is operative when the pitman arm engages the intermediate portion of the lockout member.

3. Automatic decelerating means for an automotive vehicle, as defined in claim 2, in which the vehicle is provided with dirigible wheels, and in which the pitman arm is a portion of a driving mechanism including a drag link pivotally connected at one end to the pitman arm, tie rods connected to the other end of the drag link, and knuckle arms connected to the tie rods for turning the dirigible wheels of the vehicle.

References Cited in the file of this patent

UNITED STATES PATENTS

| | | |
|---|---|---|
| 1,718,903 | Hamer | June 25, 1929 |
| 2,025,979 | Getty | Dec. 31, 1935 |
| 2,128,916 | Cox | Sept. 6, 1938 |
| 2,194,880 | Weaver | Mar. 26, 1940 |
| 2,296,003 | Van Loo | Sept. 15, 1942 |
| 2,304,546 | Cox | Dec. 8, 1942 |
| 2,346,149 | Brewer | Apr. 11, 1944 |
| 2,385,982 | Gary | Oct. 2, 1945 |
| 2,822,881 | Treharne | Feb. 11, 1958 |

FOREIGN PATENTS

| | | |
|---|---|---|
| 429,308 | Germany | May 25, 1926 |